US010423333B2

(12) United States Patent
Zia et al.

(10) Patent No.: US 10,423,333 B2
(45) Date of Patent: Sep. 24, 2019

(54) SYSTEM AND METHOD FOR SCALABLE PROCESSING OF ABORT COMMANDS IN A HOST BUS ADAPTER SYSTEM

(71) Applicant: Oracle International Corporation, Redwood Shores, CA (US)

(72) Inventors: Sajid Zia, Fremont, CA (US); Viswa Krishnamurthy, Santa Clara, CA (US); Louise Yeung, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 428 days.

(21) Appl. No.: 15/178,161

(22) Filed: Jun. 9, 2016

(65) Prior Publication Data

US 2017/0199667 A1 Jul. 13, 2017

Related U.S. Application Data (60) Provisional application No. 62/276,349, filed on Jan. 8, 2016.

(51) Int. Cl.
*G06F 13/00* (2006.01)
*G06F 3/06* (2006.01)
*G06F 13/42* (2006.01)
*G06F 13/38* (2006.01)

(52) U.S. Cl.
CPC .............. *G06F 3/061* (2013.01); *G06F 3/067* (2013.01); *G06F 3/0659* (2013.01); *G06F 13/385* (2013.01); *G06F 13/4282* (2013.01)

(58) Field of Classification Search
CPC .............................. G06F 13/385; G06F 3/0659
See application file for complete search history.

(56) References Cited

U.S. PATENT DOCUMENTS

2009/0307378 A1* 12/2009 Allen ...................... H04L 47/10
710/4
2013/0067143 A1* 3/2013 Hasegawa ............. G06F 3/0611
711/103

OTHER PUBLICATIONS

Quologic® The Ultimate in Performance, Firmware Interface Specification—Fibre Channel and Fibre Channel over Ethernet 8300 Series, Rev. A, Dec. 20, 2010, Rev. B, May 13, 2011, Rev. C, Jan. 18, 2012, 422 pages.

(Continued)

*Primary Examiner* — Zachary K Huson
(74) *Attorney, Agent, or Firm* — Tucker Ellis LLP (57) ABSTRACT

An HBA or proxy HBA device is configured to use separate Abort Buffer and I/O Buffer in each channel thereby allowing parallel queuing of regular I/O commands and Abort commands. Processing of Abort commands is prioritized such that Abort commands can be processed before all I/O commands received before the abort command are processed. The use of parallel queuing of regular I/O commands and Abort commands is of particular advantage in systems where multiple channels may receive abort commands simultaneously in the situation where the multiple channels share a common communication resource. In a particular embodiment the abort processing logic is implemented in a fiber channel adapter card which includes a proxy host bus adapter device which connects multiple HBAs via fiber channel to a storage area network.

20 Claims, 4 Drawing Sheets (56) References Cited

OTHER PUBLICATIONS

InfiniBandSM Trade Association, InfiniBand™ Architecture Specification, vol. 1, Release 1.2.1, Nov. 2007, Final Release, pp. 1-1727.

* cited by examiner

SYSTEM AND METHOD FOR SCALABLE PROCESSING OF ABORT COMMANDS IN A HOST BUS ADAPTER SYSTEM

CLAIM OF PRIORITY

This application claims the benefit of priority to U.S. Provisional Patent Application No. 62/276,349 filed Jan. 8, 2016 entitled "SYSTEM AND METHOD FOR SCALABLE PROCESSING OF ABORT COMMANDS IN A HOST BUS ADAPTER SYSTEM" which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to high performance computing systems, and is particularly related to systems and methods for processing input/output commands in network interface cards.

BACKGROUND

A server or computing system generally includes one or more processors, memory, and peripheral components and peripheral interfaces. Examples of peripheral components include cryptographic accelerators, graphics accelerators, and extensible markup language (XML) accelerators. Examples of peripheral interfaces include network interface cards (NICs), serial ATA (SATA) adapters, serial attached SCSI (SAS) adapters, RAID adapters, and Fiber Channel and iSCSI host bus adapters (HBAs). Processors, memory, and peripherals are often connected using one or more buses and bus bridges. To provide fault-tolerance, individual servers are often configured with redundant resources.

Since resources, such as peripheral components and peripheral interfaces, are assigned on a per server basis, other servers do not typically have access to these resources. In order to provide adequate resources for each server, resources are typically over-provisioned. For example, more hardware acceleration is provided than is typically needed. More network interface capacity is allocated than is typically used simply to handle worst-case or expected worst-case scenarios. Resources are over-provisioned resulting in overall waste and low utilization. Resource assignment on a per server basis also limits the ability to reconstruct or reconfigure a resource environment. A more efficient and flexible approach is to provide remote peripherals, such as storage, which can be shared among servers while maintaining quality-of-service guarantees and providing the ability to change dynamically the assignment of peripherals to servers. Such shared remote peripherals are referred to as virtualized resources.

Ethernet and InfiniBand are a commonly deployed server networking technologies and may be used for communication between servers and their remote peripherals. However, different reliability, performance, and quality-of-service guarantees are desirable for communication with remote peripherals. Consequently, additional adapter techniques and mechanisms are needed to provide efficient and reliable data transfer between servers in an InfiniBand or Ethernet network and remote peripherals.

For example, where a computer system has integrated disk storage, an interface such as the Small Computer System Interface (SCSI) can be used by the computer system to transfer data between the disk and memory. The integrated storage is typically only accessible to the computer system in which it is installed. A more efficient and flexible approach is to provide remote disk storage in a storage area network (SAN) which can be shared among servers while maintaining quality-of-service guarantees and providing the ability to change dynamically the assignment of peripherals to servers. In a Storage Area Network, the enterprise storage is maintained separate and apart from the computer system.

A fast networking technology called Fiber Channel can be used to transfer data between the enterprise storage and memory in the computer systems utilizing the enterprise storage. Fiber Channel connections utilize Fiber Channel Protocol (FOP) which is a transport protocol that transports SCSI commands over Fiber Channel networks. These connections are hot-pluggable and are usually implemented with optical fiber. A host bus adapter (HBA) connects a host computer system to other network and storage devices. In a particular HBAs can be used to connect a host computer system to remote data storage in a storage area network (SAN) in an enterprise data storage solution. A multi-channel host bus adapter card can be used to mediate data transfer between HBAs and FCP communication in a storage area network. This allows Fiber Channel to be used as a connection between an HBA of a computer server via the adapter to enterprise storage to transport SCSI information units, as defined by the Fiber Channel Protocol for SCSI (FCP). The multichannel host bus adapter card may be utilized as an I/O Director.

Data transfer with remote peripherals is described in U.S. patent application Ser. No. 11/200,761 entitled "Efficient Data Transfer Between Servers And Remote Peripherals" filed Aug. 9, 2005, which is incorporated herein by reference. An example of an I/O Director for connecting networked servers to a storage area network is described in U.S. patent application Ser. No. 12/544,744 entitled "Remote Shared Server Peripherals Over an Ethernet Network For Resource Virtualization" filed Aug. 20, 2009 which is incorporated herein by reference. An example of an I/O Director used in an InfiniBand network is described in U.S. Pat. No. 9,083,550 entitled "Network Virtualization Over InfiniBand" issued Jul. 14, 2015 which is incorporated herein by reference. These references describe some of the environments in which the invention of the present application, as described below, may be utilized.

SUMMARY

In a conventional host bus (HBA) adapter a single buffer is used for all received communications in a channel. The communications are inserted into the ring buffer and then processed in the order in which they were received. Thus, before an Abort command is processed, all I/O commands received before the abort command must be processed. In embodiments, this disclosure describes the use of a separate Abort Buffer and I/O Buffer in each channel which allows parallel queuing of regular I/O commands and Abort commands. Processing of Abort commands is prioritized such that Abort commands can be processed before all I/O commands received before the abort command are processed.

In particular embodiments, a multi-channel host bus adapter card used to mediate data transfer between HBAs and FCP communication in a storage area network is provided with a separate Abort Buffer and I/O Buffer in each channel to allow parallel queuing of regular I/O commands and Abort commands. Processing of Abort commands is prioritized such that Abort commands can be processed before all I/O commands received before the abort command are processed. This multichannel host bus adapter card can be used, for example, in an I/O Director providing connecting HBAs of computer servers to enterprise storage over a Fiber Channel SAN to transport SCSI information units, as defined by the Fiber Channel Protocol for SCSI. The use of a separate Abort Buffer and I/O Buffer and prioritizing abort commands enhances performance of the multichannel host bus adapter card by ensuring abort commands are processed expediently and avoiding unnecessary processing of I/O commands for a channel where communication is to be aborted.

In a particular embodiments, a 128 or 256 channel host bus adapter card used to mediate data transfer between HBAs and FCP communication in a storage area network is provided with a separate Abort Buffer and I/O Buffer in each channel to allow parallel queuing of regular I/O commands and Abort commands. Processing of Abort commands is prioritized such that Abort commands can be processed before all I/O commands received before the abort command are processed. Abort processing logic is implement in hardware such that each of the 256 channels can process abort commands in parallel. This multichannel host bus adapter card can be used, for example, in an I/O Director providing connecting HBAs of computer servers to enterprise storage over a Fiber Channel SAN to transport SCSI information units, as defined by the Fiber Channel Protocol for SCSI. The use of a separate Abort Buffer and I/O Buffer and prioritizing abort commands enhances performance of the multichannel host bus adapter card by ensuring abort commands are processed expediently and avoiding unnecessary processing of I/O commands for a channel where communication is to be aborted.

DETAILED DESCRIPTION

In the following detailed description, the invention will be illustrated by way of example and not by way of limitation in the figures of the accompanying drawings. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

InfiniBand is a switched fabric that provides high bandwidth, low latency, quality of service, and failover capabilities. InfiniBand provides point-to-point bidirectional serial links to connect servers, disk arrays, appliances, etc. InfiniBand offers unicast, multicast, and broadcast support and is often used in cloud computing clusters and data centers.

In particular embodiments, the servers are connected over an InfiniBand fabric to an I/O director. The I/O director provides shared and virtualized I/O resources to the servers. The common approach for providing I/O connectivity to servers and other hosts is to provide I/O controllers within the servers themselves. I/O controllers include Ethernet network interface cards (NICs), Fiber Channel, iSCSI and SAS host bus adapters (HBAs), etc. The I/O controllers are then connected to external devices using cables. External devices include switches, storage devices, display devices, and others. Cabling quickly becomes hard to manage in data centers with a significant number of servers, networks, and storage devices.

In some implementations, I/O controllers are offloaded onto an external shared system referred to herein as an I/O director. The I/O director includes actual I/O resources connected to external devices such as switches and storage. The hosts are connected to the I/O director over InfiniBand, but the number of cables required to provide redundancy and fault tolerance is much lower than the number of cables required when each host has its own I/O resources. In many cases, deploying an I/O director reduces the number of I/O cables per server from half a dozen or a dozen to one or two cables. A vHBA driver is provided for communication with the vHBA I/O modules at the I/O director and for providing host bus adapter service on the server for access to virtualized resources which correspond to those which would be provided by a local physical HBA for local physical resources. The end result is that servers have connectivity to any number of different data and storage networks using virtual I/O devices.

In a typical Server (Host) with an HBA device (known as Host HBA subsystem), disk I/O transfers are initiated by the Host HBA Driver via I/O request commands (IOCB), and managed by a local HBA device driver for set up, tear down and exception processing. The HBA device also provides hardware datapath for actual disk read and write transfers between the Host and the disk targets. One form of exception which may occur during information transfer is SCSI timeout, where the I/O command is not queued up or lost for some reason. In response to such an exception, the Host Driver issues an Abort I/O command to the HBA. The HBA driver will then dequeue the pending SCSI I/O commands.

If there are only a few HBA ports with Abort commands, then it is expected that processing of abort commands and dequeuing of pending SCSI I/O commands can be adequately performed in software by the device driver.

In an I/O virtualization system however, an I/O director is connected to multiple hosts that use the I/O director to provide virtualized I/O resources, such as virtual Network Interface Cards (vNICs) and virtual Host Bus Adapters (vHBAs). The I/O director may include multiple virtual NICs (vNICs) and virtual HBAs (vHBAs) that are mapped to particular hosts as well as a Fiber Channel switch which provides access to a Storage Area Network (SAN). Thus, in an I/O virtualization system the I/O Director can be associated with a large number of virtual HBAs. Hundreds of virtual HBAs may share physical resources and thus may experience a SCSI exception simultaneously from the SAN. Thus, in a virtualized I/O system hundreds of virtual HBAs may need to process I/O abort commands simultaneously.

If the I/O abort commands are processed in software they will typically be processed sequentially on the I/O processor of the HBA. The processing of hundreds of I/O abort commands simultaneously and dequeuing of pending SCSI I/O commands can delay processing of abort commands. For example, if the HBA driver software in the I/O Director is required to handle large numbers of abort commands at the same time, the processing of the abort commands and dequeuing of pending SCSI I/O commands can result in delays of several seconds or more, which is longer than the SCSI timeout causing a potential violation of the SCSI time out and/or blockage of other virtual HBA transfers that did not receive abort commands. Moreover, the SCSI timeout is in some circumstances shorter for abort processing than the typical SCSI timeout of 30-60 seconds for data read/write. For example, abort command can be required to process in less than two seconds whereas SCSI read/write operations typically do not timeout until 60 seconds has passed. Thus, the potential delays caused by processing of hundreds of I/O abort commands simultaneously and dequeuing of pending SCSI I/O commands can exceed specified timeout periods for abort processing leading to problems in communication.

In particular embodiments described herein, a hardware device, acts as a proxy host to the HBA device in an I/O adapter card. The proxy host device (PHD) issues I/O commands and handles data read and writes. The PHD behaves like a collection of multiple hardware HBAs serving as proxies for HBAs on connected computer systems. When implemented in software HBAs are called virtual HBAs (vHBAs). When implemented in the hardware of the PHD the HBAs are called xHBAs. The PHD may be implemented in configurable hardware such as a Field Programmable Gate Array (FPGA), or alternatively may be implemented in a custom Application Specific Integrated Circuit (ASIC). Essentially configurable or custom hardware is configured to perform certain HBA logic and is duplicated for each xHBA.

The PHD is designed to support wirespeed data path transfers. In embodiments, the hardware device is configured to handle processing of Abort I/O commands in hardware. Offloading abort processing logic from I/O processor software in which the commands are processed sequentially to hardware in the PHD in which the commands can be processed in parallel for each channel results in a scalable (to the number of xHBAs) and fast abort handling solution. It also allows the I/O processor software to perform its function with no speed degradation for other xHBAs that are not impacted by Abort commands.

To expedite abort processing in hardware, data I/O command/descriptor ring data structures in the Host memory (managed by the Host xHBA driver) are added for each channel and used exclusively for queuing Abort commands issued when the SCSI layer detects that a xHBA needs to be dequeued. Thus, the system includes separate/parallel data I/O command/descriptor ring data structures for parallel queuing of regular I/O commands and Abort commands for each channel. There is a clear one to one correspondence (in terms of IOCB handle, target Q ID). There is also no blocking of normal I/O processing, because there is no time multiplexing of I/O and Abort commands on the same command/descriptor ring. Accordingly I/O commands can be processed in hardware and do not need to wait for earlier issued I/O commands to be processed.

In a conventional host bus adapter, a single buffer is used for all received communications. The communications are inserted into the ring buffer and then processed in the order in which they were received. Thus, before an Abort command is processed, all I/O commands received before the abort command must be processed. The use of a separate Abort Buffer and I/O Buffer in each channel allows parallel queuing of regular I/O commands and Abort commands. This is advantageous because operating systems can have more stringent timing requirements for processing of abort commands as compared to regular I/O. For example, abort command can be required to process in less than two seconds whereas SCSI read/write operations typically do not timeout until 60 seconds has passed.

The system leverages what the Host xHBA driver is already doing for regular disk I/O commands. This parallel structure for abort and regular I/O commands and path extends into the PHD and adds another set of write index registers for Abort commands for each its xHBA/target queue. A scheduling mux is used to schedule Abort commands in a round robin fashion for all xHBAs. Additionally, a two to one priority scheduling mux between the current regular I/O command to be served and the winning Abort command to be served.

Also duplicated is the write request queue to the HBA device, such that a dedicated abort request queue is provided for each xHBA. A scheduling selector is used to schedule Abort requests in a round robin fashion for all xHBAs. Additionally, a two to one priority scheduling mux between the current regular I/O command to be served and the winning Abort request to be served.

The Abort command will contain the target queue number for the xHBA to be flushed—all logic associated with the IOCB request queue for the HBA device will be cleared. An HBA Abort command will be issued to the physical HBA device for that queue. The infrastructure to handle Abort commands by the physical HBA device remains unchanged in this new method and is described in the next paragraph. The PHD hides the scheduling of I/O and Abort commands for all its xHBAs. Depending on the state of the original IOCB operation, one of two things will happen. If the PHD finds the IOCB handle/context, then the original IOCB will be returned with status 0x05 and the Abort IOCB will have a status of 0x00. If the PHD cannot find the IOCB handle/context, the original IOCB status will be returned with status of 0x00 and the Abort IOCB will have a status of 0x31.

Whether there is loss of IOCB handle or not, both original IOCB completion and Abort responses will be sent back to hardware device by the PHD. Aborts for all xHBAs are treated as high priority over normal IOCBs. This allows the system to satisfy the shorter abort timeout of only 2 seconds (the regular IOCB timeout is of 30 seconds and thus processing requirements are less stringent).

Figure 1:
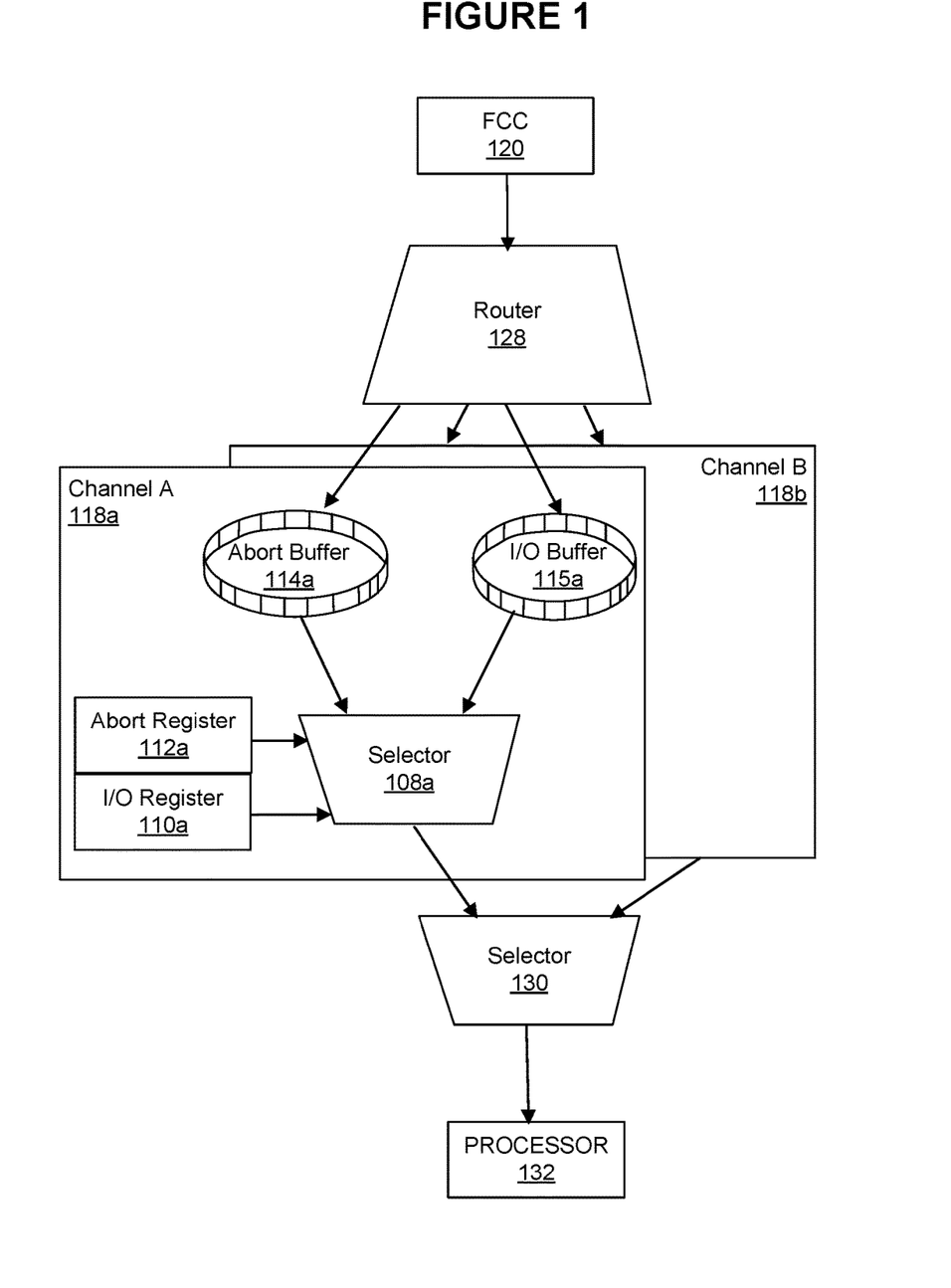
FIG. 1 shows abort processing logic according to an embodiment of the present invention.

FIG. 1, illustrates operation of the abort logic for two channels 118a, 118b of an xHBA system according to an embodiment of the present invention. There may be 128, 256, 512 or more channels in an I/O Card and the abort logic of FIG. 1 is duplicated for each such channel. As shown in FIG. 1, two ring buffers are associated with Channel A 118a. An Abort Buffer 114a is dedicated to receiving abort commands for Channel A received from a Fiber Channel Controller 120. The Abort Buffer 114a of Channel A is used to queue up Abort I/O commands, should the Fiber Channel Controller 120 determine that I/O commands for a particular channel/xHBA needs to be dequeued. A separate I/O Buffer 115a in Channel A 118a receives read/write instructions.

Router 128 receives incoming communications from the FCC 120 and distributes the communications to the correct Channel and to the correct ring buffer in each channel. The router 128 utilizes IOCB handles for routing communications. There is a one to one correspondence between the IOCB handle and the target channel corresponding to a target queue pair thus allowing the router 128 to ensure writing to the correct pair of buffers.

A set of registers is provided for Abort commands for each of the xHBA queues in addition to a set of registers for I/O commands. A scheduling mux/selector 130 is provided to schedule Abort commands in a round robin fashion for all xHBAs. The winning register selected by selector 108a is used to direct the processor 132 to the correct ring buffer position to receive and process the abort or I/O command. Additionally, a two to one priority scheduling mux/selector 108a selects between the current regular I/O command to be served and the Abort command to be served.

As illustrated in FIG. 1, for example Abort Register 112a is selected, so the processor 110 retrieves and processes the next command in Abort Buffer 114a. When an abort command is processed for a particular channel, the target queue number for the xHBA to be flushed—all logic associated with the IOCB request queue for the HBA device will be cleared. An HBA Abort command will be issued to the physical HBA device for that queue.

Conventional infrastructure can be used to handle Abort commands by the I/O card. The PHD performs the scheduling of I/O and Abort commands for all of the xHBAs transparently. That is each xHBA is essentially unaware of the other xHBAs with which it is sharing processing. Depending on the state of the original IOCB operation, one of two things will happen. If the Processor finds the IOCB handle/context (i.e. the IOCB is still pending), then the original IOCB will be returned with status 0x05 and the Abort IOCB will be returned with a status of 0x00. If the processor cannot find the IOCB handle/context (i.e. the IOCB has been processed prior to processing of the abort command), the original IOCB status will be returned with status of 0x00 and the Abort IOCB will be returned with a status of 0x31. Whether there is loss of IOCB handle or not, both original IOCB completion and Abort response will be sent back to xHBA by the processor.

Aborts for all xHBAs are treated as high priority over normal IOCBs. This is because abort timeout is only 2 seconds whereas original IOCB timeout is minimum of 30 seconds. The selector 108a therefore provides two to one priority scheduling of abort commands and regular I/O commands to be served. Thus, assuming that there are both abort commands and I/O commands addressed in the registers, the selector 108a which will pick two addresses from the abort registers for every address picked from the I/O registers. The particular level of priority can be selected based on the needs of the system taking into consideration the stringency of the timing requirements for abort processing, the maximum number of simultaneous abort requests that may require processing and process time for each abort request.

Figure 2A:
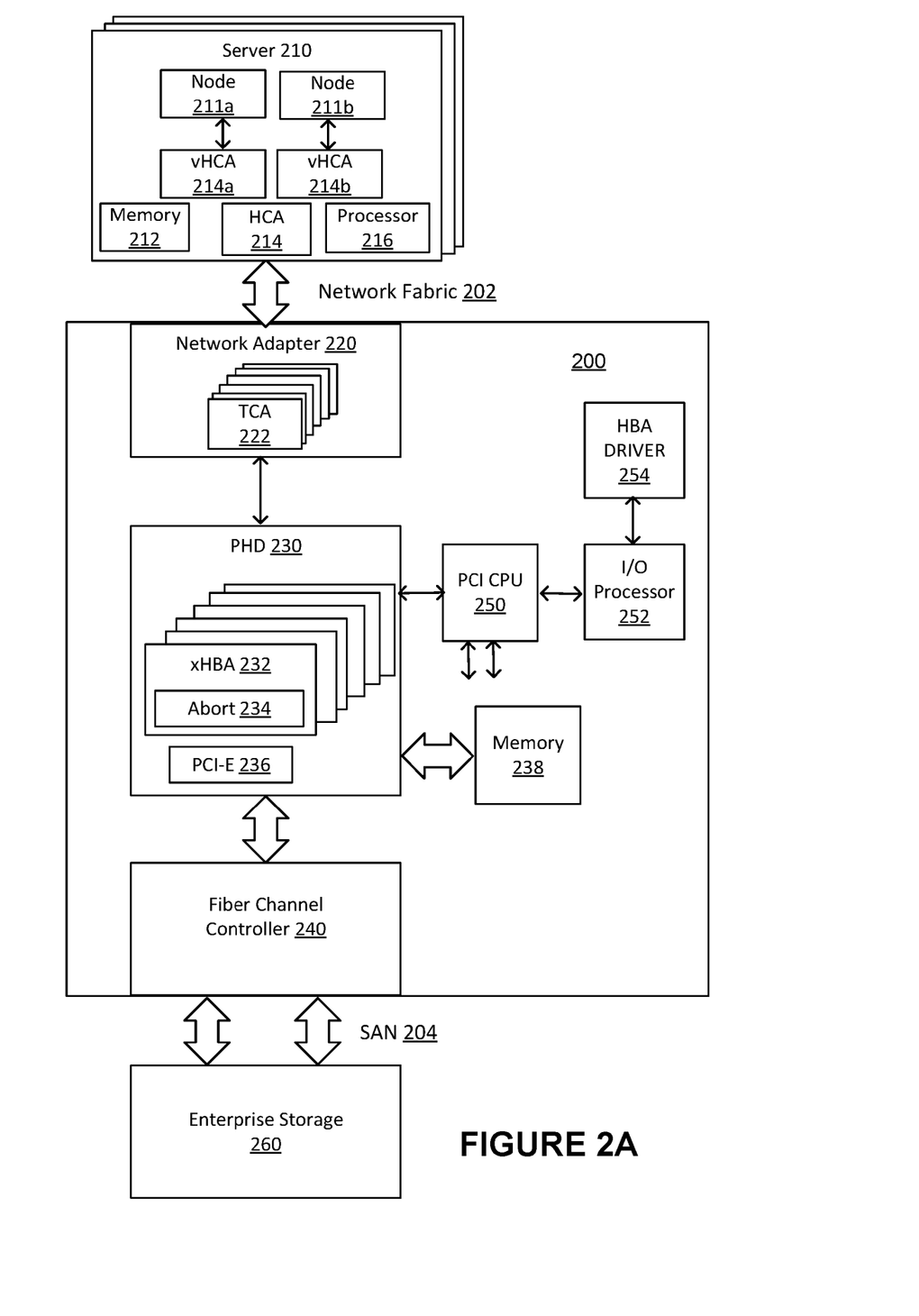
FIG. 2A shows a block diagram of a multi-channel host bus adapter card incorporating the abort processing logic of FIG. 1 according to an embodiment of the invention.

FIG. 2A illustrates one example of a system that can use the techniques and mechanisms of the present invention. A collection of Servers 210 are connected to a multi-channel Host Bus Adapter Card 200 over a Network Fabric 202. The Network Fabric 202 can be for example an InfiniBand network fabric or an Ethernet network fabric. Each Server 210 includes a Memory 212, Processor 216 and Host Channel Adapter (HCA) 214. One or more server Nodes 211a, 211b operate on each Server 210. Each of the one or more server Nodes 211a, 211b can communicate over Network Fabric 202 using a separate channel using a virtual HCA provided by vHCA 214a, vHCA 214b.

The I/O Card 200 includes a Network Adapter 220 which interfaces with each of the collection of Servers 210 over the Network Fabric 202. The Network Adapter 220 includes a plurality of Target Channel Adapters 222. Each TCA 222 is coupled to a vHCA of a Node 211a, 211b over the Network Fabric and establishes queue pairs for message transport between the HCAs and TCAs. The Network Adapter 220 may be implemented in configurable hardware such as a Field Programmable Gate Array (FPGA), or alternatively may be implemented in a custom Application Specific Integrated Circuit (ASIC). The Network Adapter 220 is coupled to PHD 230 over a bus.

PHD 230 includes a plurality of xHBAs 232. Each xHBA 232 is mapped to a TCA 222 of the Network Adapter 220. Thus, for example each node on the collection of servers can have its own dedicated channel comprising a dedicated vHCA, TCA, and xHBA. It should be noted that the node to xHBA correspondence need not be one-to-one. In embodiments of the invention, each xHBA 232 includes Abort Processing Logic 234 implemented in PHD 230. PHD 230 includes a PCI-E Adapter 236 or similar interface which provides a high bandwidth connection between the xHBAs 232 and a Fiber Channel Controller (FCC) 240. FCC 240 connects to Enterprise Storage 260 over a Storage Area Network (SAN) 204. In an embodiment, multiple InfiniBand Queue Pairs (QPs) connect to the Network Adapter 220. The Network Adapter 220 implements the Target Channel Adapters (TCA) 222 corresponding to the Host Channel Adapters (HCA) 214 of the Server Node. The Network Adapter converts the Queue Pair data transfers over the Network Fabric 202 to a high bandwidth internal protocol for communication to PHD 230. Accordingly the Queue Pairs provide connections through the Network Fabric from the Server Nodes to the xHBAs 232 of PHD 230 via the Network Adapter 220.

In embodiments of the present invention, each xHBA 232 is provided with abort processing logic 234 implemented in the hardware of the PHD 230 which allows an HBA driver 254 to delegate handing of Abort commands to the collection of xHBAs 232 instead of processing them on the I/O processor 252 of the I/O Card 200. The abort processing logic 234 is included in each xHBA 232 and thus provides scalable abort processing and dequeuing of pending SCSI commands quickly and in parallel for each xHBA 232. Thus, use of the abort processing logic 234 included in each xHBA 232 of the PHD 230 to process abort commands avoids the potential delays caused by sequential processing of hundreds of I/O abort commands by the HBA driver 254. Moreover, while the abort processing logic 234 included in each xHBA 232 of the PHD 230 is processing the I/O abort commands, the HBA driver 254 and other I/O processor software operating on the I/O Processor 252 can function with no speed degradation for other xHBAs 232 that are not impacted by Abort commands.

PHD 230 connects to one or more Fiber Channel Controller 240. FCC 240 is typically employed immediately adjacent a CPU and performs disk reads and disk writes directly to server virtual memory. However, in the I/O Card 200 FCC 240 is not connected directly to a CPU but instead to the PHD 230. PHD 230 therefore provides temporary storage in an off chip Memory 238 for buffering disk read and disk write I/O. Disk read/write is performed between the FCC 240 and the local Memory 238 according to the target xHBA, the target XHBA can then process the data in the Memory 238 and relay it via an associated TCA 222 of Network adapter 220 to the correct queue pair and associated vHCA and server node. Thus, PHD 230 makes FCC 240 think that the server node memory is local when in reality there is a low latency network 202 between the FCC 240 and the server nodes 211a, 211b. The connection between PHD 230 and FCC 240 can use, for example, one or more PCIE 2.0 interfaces. In an embodiment 4-lane PCI-E interface can run up to 4 ports at 5 Gbps for a total of 20 Gbps raw.

In an embodiment, the I/O Card supports 256. Channels. Each channel comprises a TCA 222 connected to an xHBA. Thus Network Adapter 220 supports 256 TCAs 222 and PHD 230 supports 256 xHBAs. The 256 TCAs may correspond to up to 256 vHCAs associated with up to 256 server nodes. Communications with Enterprise Storage 260 are transmitted over SAN 204 to and from Fiber Channel Controller 240 and thence via a PCI-E bus to PHD 230. PHD 230 routes communications to the appropriate xHBA 232 of the PHD 230 (using Memory 238 for buffering). Once routed to the appropriate PHD 230 a dedicated channel handles communications with a corresponding TCA 222, vHCA 214a, 214b and node 211a, 211b. Note that not all TCAs and xHBAs may be in use at a particular time. Also, embodiments of I/O Card 200 may support 16, 64, 128, 256, 512, 1024 or more channels depending on the implementation without departing from the scope of the present invention.

Embodiments of the present invention are particularly advantageous in a multichannel I/O Card as described because incorporation of the identified abort processing logic and abort prioritization allows increasing the number of xHBAs supported by the device. This is in alignment with the support of large number of server nodes (for example JVMs) on high density server systems which require a large number of channels to the storage area network and thus a large number of xHBAs. The abort processing module allows the local I/O processor software/HBA driver to continue managing other virtual HBAs, including e.g. set up and tear down without being affected by simultaneous abort processing of an arbitrary number of xHBAs.

Figure 2B:
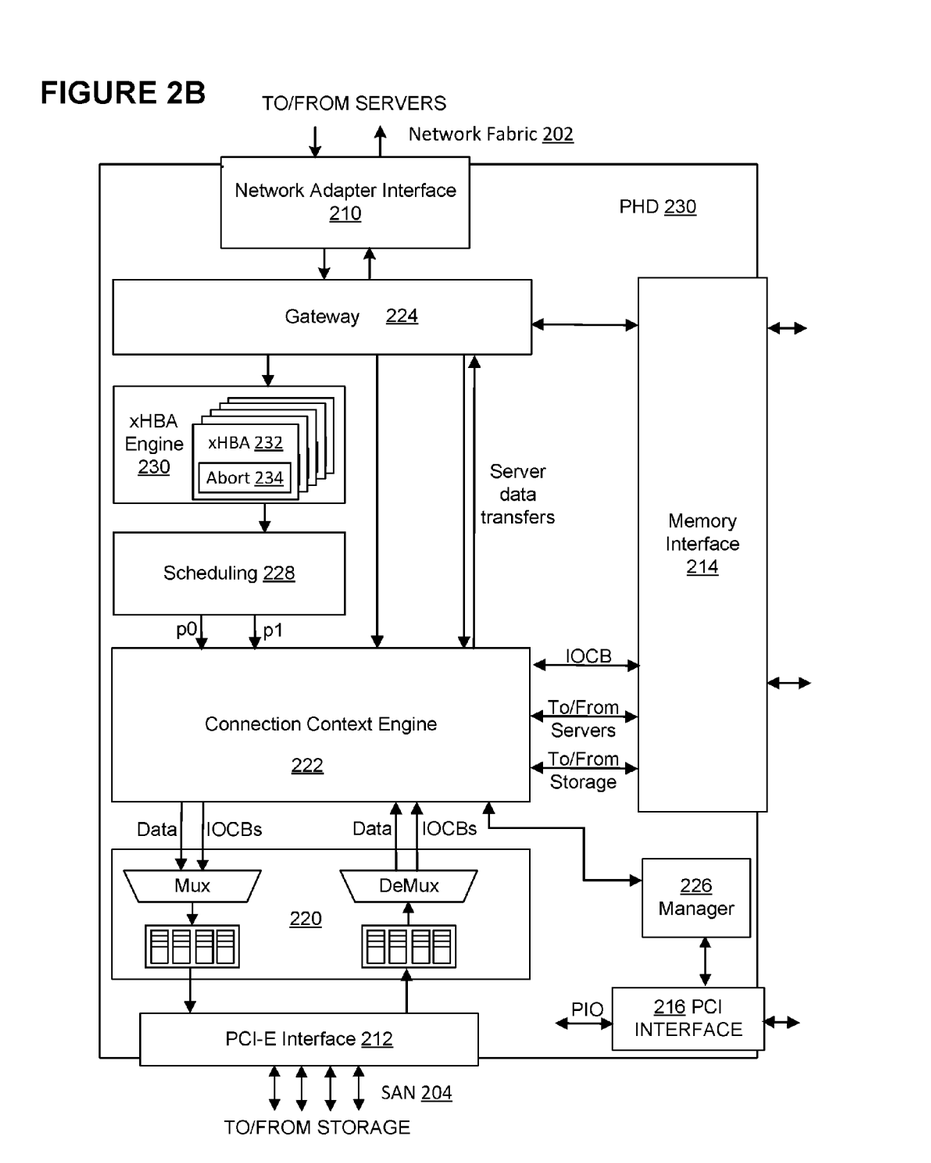
FIG. 2B shows a block diagram of multi-channel host bus adapter chip incorporating abort processing logic of FIG. 1 according to an embodiment of the invention.

FIG. 2B shows a block diagram of multi-channel host bus adapter chip PHD 230. As shown in FIG. 2B, PHD 230 includes: a Network Adapter Interface 210 for communicating with Network Adapter 220; and a PCI-E Interface 212 for communicating with FCC 240; a Memory Interface 214 for communicating with Memory 238; and a PCI Interface 216 for communicating with the PCI CPU 250 and I/O Processor 252 (See FIG. 2A for elements not shown in FIG. 2B). PHD 230 includes Mux/Demux module 220. Memory Interface 214 allows PHD 230 to buffer ingress traffic (to the server) and egress traffic (to FCC 240). Mux/Demux module receives data and IOCB from FCC 240 over PCI-E Interface 212 and distributes the data and IOCB to the appropriate connection context or connection contexts 222. Mux/Demux module receives data and IOCB from all connection contexts 222 and muxes the data and IOCB to for transmission to FCC 240 over PCI-E Interface 212. The connection context 222 has up to 2048 active contexts for active I/O commands. These active contexts correspond to the open FC exchanges on FCC 240. The connection context 222 maintains state for these I/O transfers including the request IOCBs, response IOCBS, and data transfer. The PCI Interface 216 contains the CPU PCI core providing CPU access to the internal RAM or registers of PHD 230. Task management operations for flushing out active I/O commands in FCC 240 are effected through Manager 226. Scheduling block 228 is a traffic manager which implements quality of service (QoS) rate control. Module 230 includes the plurality of xHBA 232 and abort logic 234 which includes target queue configurations, states, and arbitration among targets queue for each xHBA channel.

Connection Context Engine 222 manages a pool of 2048 connections for disk read and disk write operations with the FCC 240. The 2048 "connections" allows for parallel FC operations to target devices; each connection corresponds to a fiber channel exchange in FCC 240. The Connection Context Engine 222 maintains state for each connection, fetches or retrieves data back and forth from the server chip, and handles some system level task management features to provide access to context state. There are essentially three operations through the connection context engine 222, disk read, disk write, and management IOCB. The connection context engine 222 keeps all disk writes in order and disk read/other in order. For a given target queue, the order needs to be maintained.

The xHBA Engine 230 maintains 8 entry on chip descriptor header queues (parse length, I/O type, etc). It also contains per XHBA configuration, and handles some Infini-Band (IB) functions. The xHBA Engine 230 maintains 1024 target queues for a per port configurable M×N mapping (M XHBAs×N ports). The xHBA Engine 230 informs Scheduling 228 when IOCBs are available for a given XHBA and performs per target arbitration after scheduling is done. The xHBA Engine 230 also maintains XHBA enable/flush state for each XHBAs, sends flush status to vh_xt3ctl and vh_cc for QP down flushing and maintains outstanding IOCB count which should go to zero when flush is done. The xHBA Engine 230 keeps track of outstanding disk writes for each target queue before connection context indicates prefetch is done and blocks disk reads for each target queue where this count is non-zero. The xHBA Engine 230 drops unsupported IOCBs and sends them via interrupt through a FIFO to the CPU.

In embodiments, each xHBA 232 in xHBA engine 230 is provided with abort processing logic 234 implemented in the hardware of the xHBA engine 230 which allows processing of Abort commands in the collection of xHBAs 232 instead of processing them on the I/O processor 252 of the I/O Card 200. The abort processing logic 234 is included in each xHBA 232 and thus provides scalable abort processing and dequeuing of pending SCSI commands quickly and in parallel for each xHBA 232. Thus, use of the abort processing logic 234 included in each xHBA 232 of the PHD 230 to process abort commands avoids the potential delays caused by sequential processing of hundreds of I/O abort commands by the HBA driver 254. Moreover, while the abort processing logic 234 included in each xHBA 232 of the PHD 230 is processing the I/O abort commands, the HBA driver 254 and other I/O processor software operating on the I/O Processor 252 can function with no speed degradation for other xHBAs 232 that are not impacted by Abort commands. In a particular embodiment xHBA engine 230 is implemented in a Field Programmable Gate Array (FPGA).

Figure 3:
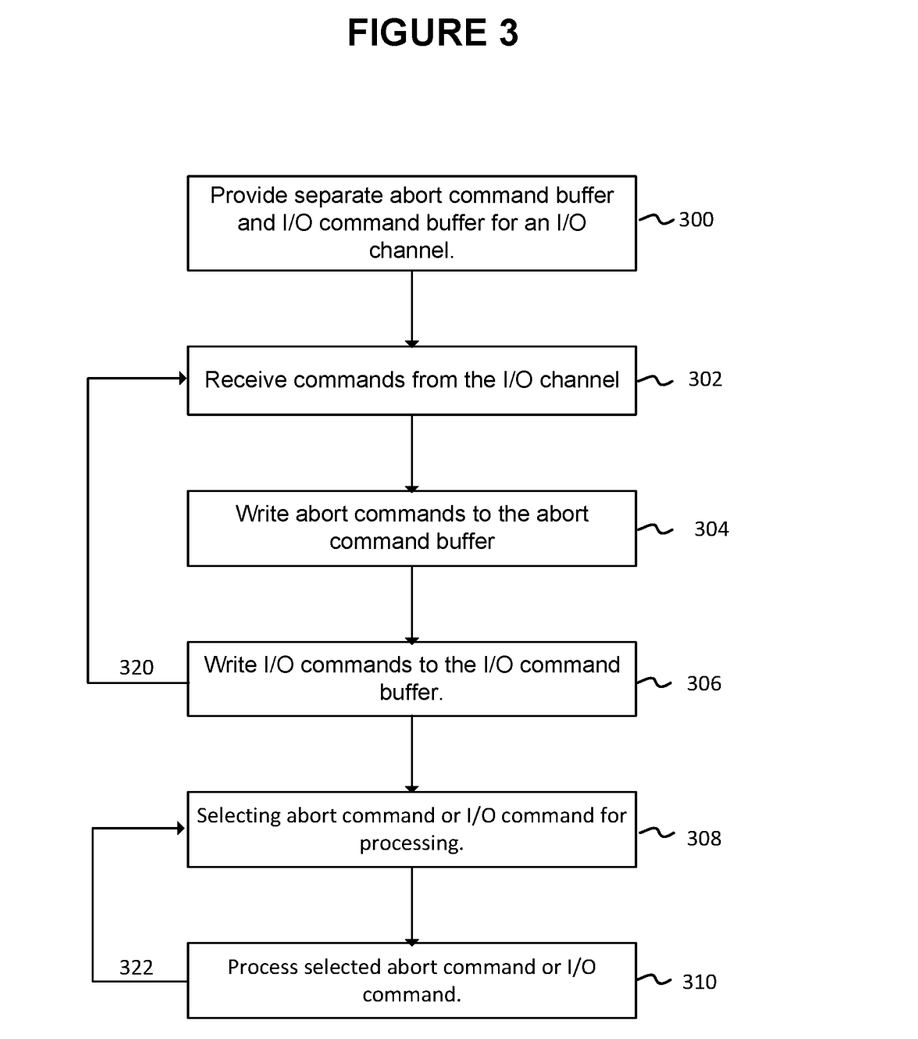
FIG. 3 shows a method of processing abort commands according to an embodiment of the present invention.

FIG. 3 shows an overview of a method of processing abort commands according to an embodiment of the present invention. In general, a method for supporting abort processing in a host bus adapter system includes providing a first processing path for processing abort commands, providing a second processing path for processing regular I/O commands, providing a selector for selecting commands to be processed, routing received commands to the first processing path if they are abort commands and to the second processing path if they are regular I/O commands, thereby providing for abort commands and regular I/O commands to be processed in parallel and the selector is configured to prioritize processing of abort commands. The method can be implemented in single channel devices but has particular advantage in multi-channels systems of 64, 128, 256 or more channels having first and second processing paths for each channel. In multichannel systems the method allows abort processing capability to scale with the number of channels rather than creating abort processing bottleneck at the level of the I/O driver and I/O processor.

As shown, for example, in FIG. 3, at step 300 a separate abort command buffer and I/O command buffer is provided for a communication channel. At step 302, command are received over the communication channel. At step 304 abort commands which are received over the communication channel are written to the abort command buffer. At step 306 regular supported (non-abort) I/O commands are written to the I/O command buffer. As shown by arrow 320 the process of writing commands to the separate abort command buffer and I/O command buffer continues in a loop.

At step 308, abort command or an I/O command is selected for processing. As described above, two to one priority scheduling can be performed such that abort command processing is given priority over regular I/O commands. At step 310 the selected abort command or I/O command is processed. This ensure that abort commands (if any have been received) are processed before I/O commands that may have been earlier received. This ensure that abort commands (if any have been received) are processed before I/O commands that may have been earlier received. As shown by arrow 322 the process of selecting and execution commands from the separate abort command buffer and I/O command buffer continues in a loop.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A host bus adapter system comprising at least 128 of channels, each channel comprising:
   a first processing path for processing abort commands;
   a first buffer for queuing abort commands in the first processing path;
   a second processing path for processing regular I/O commands;
   a second buffer for queuing regular I/O commands in the second processing path;
   a selector for selecting commands to be processed;
   whereby abort commands and regular I/O commands are processed in parallel and the selector is configured to prioritize processing of abort commands.

2. The host bus adapter system of claim 1 wherein:
   the first processing path comprises a first register;
   the second processing path comprises a second register; and
   wherein the selector is configured to select abort commands from the first buffer and I/O commands from the second buffer and is configured to prioritize processing of abort commands.

3. The host bus adapter system of claim 1 wherein:
   the first buffer comprises a first ring buffer for queuing abort commands and a first register;
   the second buffer comprises a second ring buffer for queuing regular I/O commands and a second register; and
   wherein the selector is configured to select abort commands from the first ring buffer and I/O commands from the second ring buffer and is configured to prioritize processing of abort commands.

4. The host bus adapter system of claim 1, wherein:
   said first processing path, said second processing path, and said selector for each of said at least 128 channels is implemented in an FPGA.

5. The host bus adapter system of claim 1, wherein the host bus adapter system comprises a fiber channel adapter and a proxy host bus adapter.

6. The host bus adapter system of claim 1 wherein:
   the host bus adapter system further comprises a router for receiving regular I/O commands and abort commands and directing said commands to a particular channel of the at least 128 channels and to one of the first processing path and second processing path of said particular channel of the at least 128 channels based on whether the received command is a regular I/O command or an abort command.

7. The host bus adapter system of claim 2, wherein:
   said first buffer, said second buffer, said first processing path, said second processing path, and said selector are implemented in hardware.

8. The host bus adapter system of claim 2, wherein:
the first processing path, first buffer, second processing path, second buffer, and selector for each of the at least 128 channels is implemented in an FPGA.

9. The host bus adapter system of claim 2, wherein:
said first buffer, said second buffer, said first processing path, said second processing path, and said selector for each of said 128 channels are implemented in hardware.

10. The host bus adapter system of claim 2, wherein:
said first buffer, said second buffer, said first processing path, said second processing path, and said selector for each of said 128 channels are implemented in hardware; and
wherein the host bus adapter system further comprises a router for receiving regular I/O commands and abort commands and directing said commands to a particular channel of the at least 128 channels and to one of the first processing and second processing path of the particular channel based on whether the received command is a regular I/O command or an abort command.

11. A computer-implemented method for supporting abort processing in a host bus adapter system, the method comprising:
providing at least 128 of channels;
providing, for each of said at least 128 channels, a first processing path for processing abort commands, wherein the first processing path comprises a first buffer for queuing abort commands;
providing, for each of said at least 128 channels, a second processing path for processing regular I/O commands, wherein the second processing path comprises a second buffer for queuing regular I/O commands;
providing, for each of said at least 128 channels, a selector for selecting commands to be processed;
routing, for each of said at least 128 channels, received commands to the first processing path if they are abort commands and to the second processing path if they are regular I/O commands;
whereby, for each of said at least 128 channels, abort commands and regular I/O commands are processed in parallel and the selector is configured to prioritize processing of abort commands.

12. The method of claim 11 wherein:
providing, for each of said at least 128 channels, a first register associated with the first buffer for queuing abort commands;
providing, for each of said at least 128 channels, a second register associated with the second buffer for queuing regular I/O commands; and
wherein the method further comprises, for each of said at least 128 channels, selecting abort commands from the first buffer and I/O commands from the second buffer using the selector to prioritize processing of abort commands.

13. The method of claim 11 wherein:
said first buffer is a first ring buffer and said second buffer is a second ring buffer.

14. The method of claim 11, wherein providing, for each of said at least 128 channels, the first processing path, the second processing path, and the selector comprises:
configuring an FPGA to provide, for each of said at least 128 channels, the first processing path, the second processing path, and the selector.

15. The method of claim 11, further comprising:
providing the host bus adapter system with a fiber channel adapter and a proxy host bus adapter.

16. The method of claim 11 further comprising:
providing a router for receiving regular I/O commands and abort commands and directing said commands to a particular channel of said at least 128 channels and to one of the first processing and second processing path based on whether the received command is a regular I/O command or an abort command.

17. The method of claim 12, further comprising:
providing, for each of the at least 128 channels, a first register for storing a next abort command position in said first buffer and a second register for storing a next regular I/O command position in said second buffer.

18. The method of claim 11, further comprising:
providing, for each of the at least 128 channels, a first register for storing a next abort command position in said first buffer and a second register for storing a next regular I/O command position in said second buffer; and
providing a scheduling selector which schedules commands in a round robin fashion for all of said at least 128 channels.

19. The method of claim 11, wherein providing, for each of said at least 128 channels, a selector for selecting commands to be processed comprises:
providing, for each of said at least 128 channels, a two to one priority scheduling mux for selecting commands to be processed from the first buffer and the second buffer.

20. A non-transitory computer-readable storage medium having stored thereon for supporting abort processing in a host bus adapter system, which instructions, when executed cause the host bus adapter system to perform steps comprising:
providing at least 128 of channels;
providing, for each of said at least 128 channels, a first processing path for processing abort commands, wherein the first processing path comprises a first buffer for queuing abort commands;
providing, for each of said at least 128 channels, a second processing path for processing regular I/O commands, wherein the second processing path comprises a second buffer for queuing regular I/O commands;
providing, for each of said at least 128 channels, a selector for selecting commands to be processed;
routing, for each of said at least 128 channels, received commands to the first processing path if they are abort commands and to the second processing path if they are regular I/O commands;
whereby, for each of said at least 128 channels, abort commands and regular I/O commands are processed in parallel and the selector is configured to prioritize processing of abort commands.

* * * * *

UNITED STATES PATENT AND TRADEMARK OFFICE
CERTIFICATE OF CORRECTION

| | |
|---|---|
| PATENT NO. | : 10,423,333 B2 |
| APPLICATION NO. | : 15/178161 |
| DATED | : September 24, 2019 |
| INVENTOR(S) | : Zia et al. |

It is certified that error appears in the above-identified patent and that said Letters Patent is hereby corrected as shown below:

In the Specification

In Column 9, Line 25, delete "256." and insert -- 256 --, therefor.

Signed and Sealed this
Eighth Day of September, 2020

Andrei Iancu
*Director of the United States Patent and Trademark Office*